UNITED STATES PATENT OFFICE.

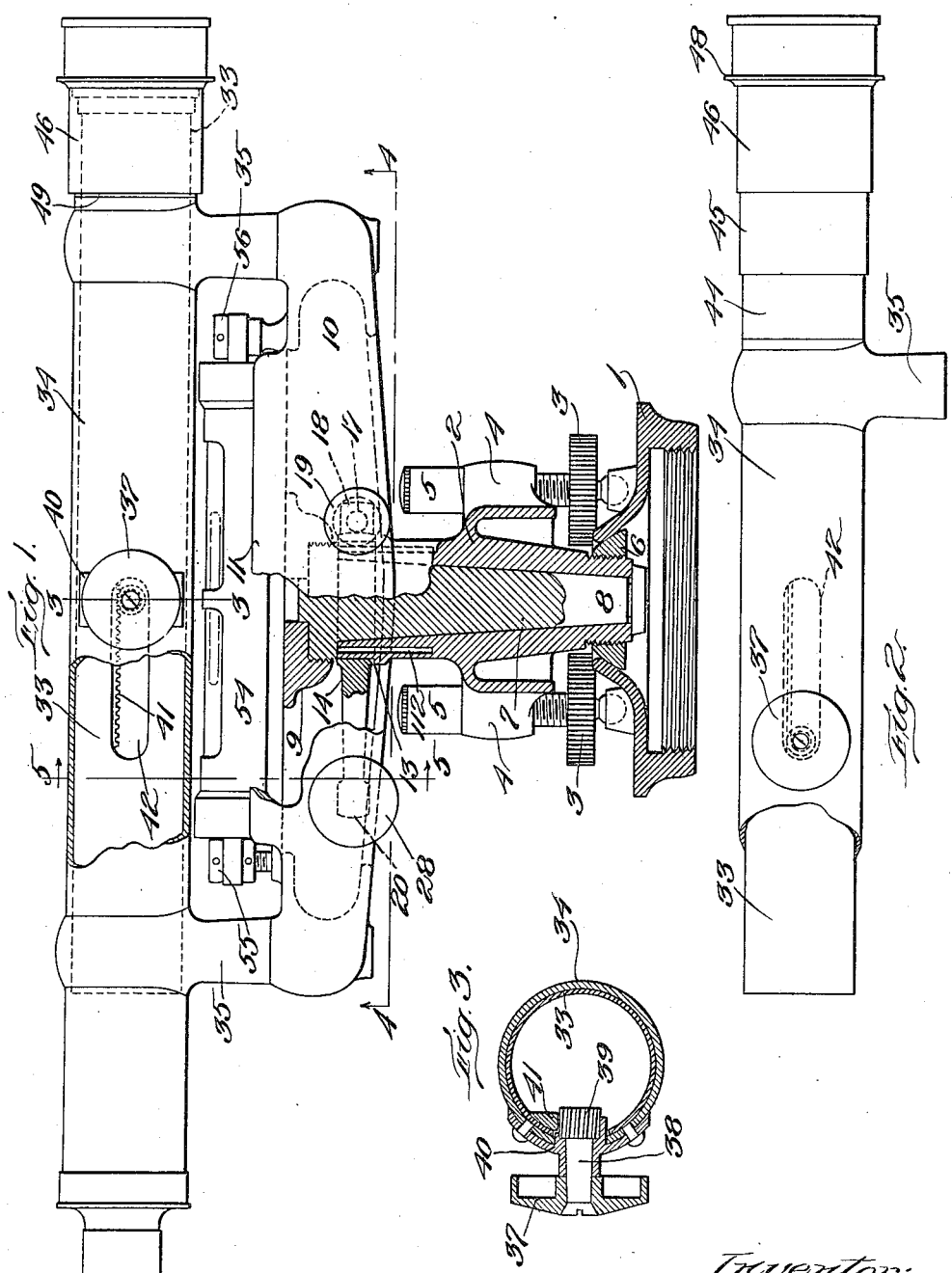

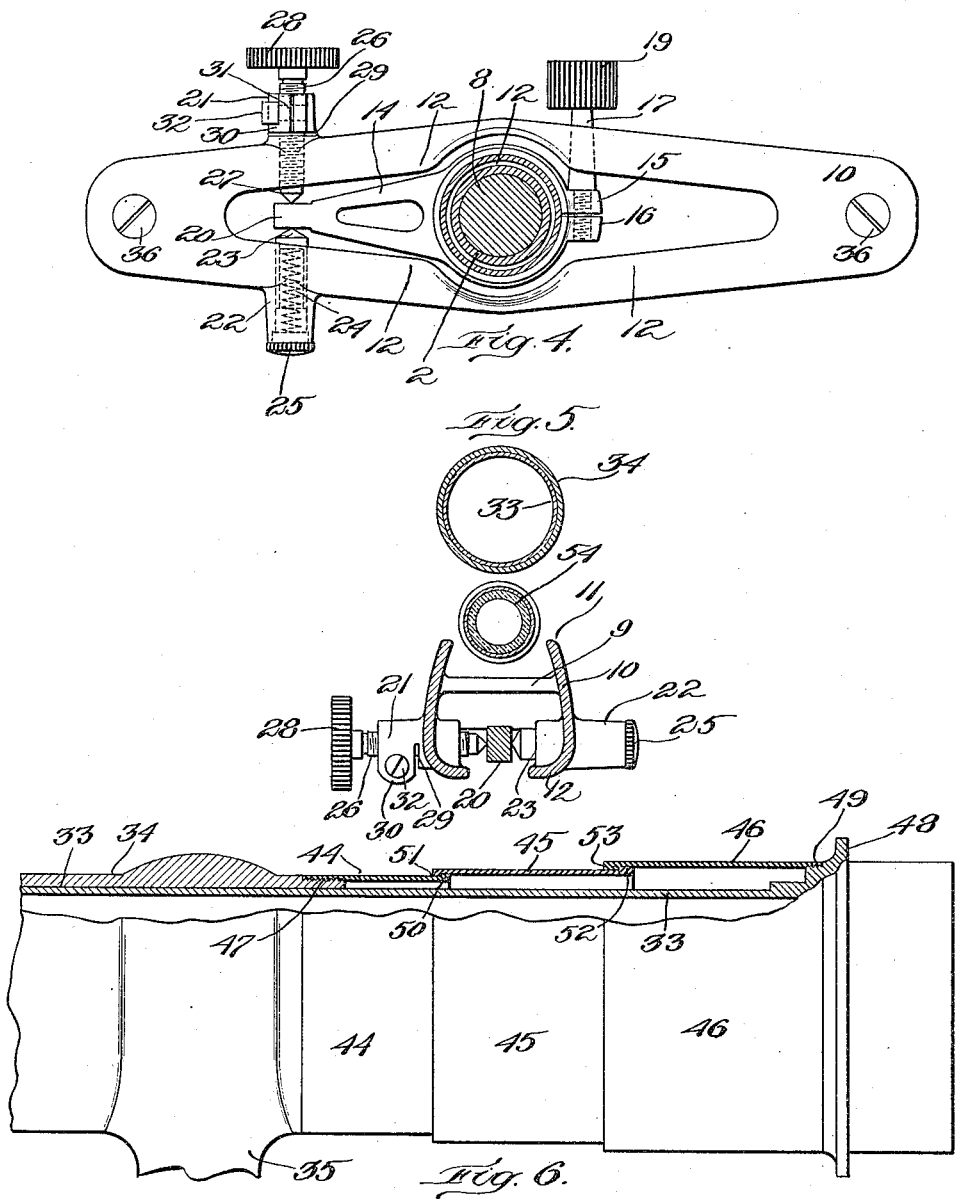

LOUIS H. BERGER, OF ROXBURY, MASSACHUSETTS.

SURVEYOR'S INSTRUMENT.

1,193,978.  Specification of Letters Patent.  Patented Aug. 8, 1916.

Application filed May 24, 1915. Serial No. 30,030.

*To all whom it may concern:*

Be it known that I, LOUIS H. BERGER, a citizen of the United States, and resident of Roxbury, in the county of Suffolk and State of Massachusetts, have invented an Improvement in Surveyors' Instruments, of which the following description, in connection with the accompanying drawings, is a specification, like letters on the drawings representing like parts.

The object of the present invention is to improve and perfect the construction of a surveyor's instrument.

My present invention provides novel protecting features for the spindle clamp, telescope barrel, and bearings, improved form of leveling bar and also a lower center of gravity for the leveling bar upon the supporting post.

Further features of the present invention are to so construct the entire telescope supporting bar and central bearing of the instrument as to provide a rain and dust protection for the central bearing, to protect the spindle clamp and its bearing on the central supporting post, and protecting the supporting post and spindle itself from injury or distortion. These features I accomplish by entirely concealing the spindle clamp within the cross bar and forming the cross bar of novel contour for this purpose, so that it entirely overhangs and protects the supporting spindle and the central support therefor, enabling both to be made relatively short and thus to lower the center of gravity of the entire device without decreasing the customary length of the spindle. I protect the telescope slide and the bearing therefor in which it slides, from dust, rain, etc. by novel form of telescopic dust guard. This feature is of particular importance and value in many classes of work, such as underground mining, tunneling, etc., wherein particles of dirt, dust and water are constantly dropping from overhead on to the instrument, and with the focusing slide of the telescope extended from the casing, to secure proper focus, the focusing slide and its bearing are subject to damage by the dust and moisture working in between the telescope focusing slide and its bearing during the adjustment outwardly and inwardly thereof.

Other novel details of construction, important features, and combination of parts will be hereinafter more fully described and claimed.

Referring to the drawings illustrating a preferred form of the invention, Figure 1 is a view partly in cross section of the leveling base, supporting bar, and telescope of a surveying instrument; Fig. 2 is a fragmentary view with the telescope extended; Fig. 3 is a cross sectional view on the line 3—3 of Fig. 1; Fig. 4 is a plan view looking upwardly on the line 4—4 of Fig. 1; Fig. 5 is a cross sectional view on the line 5—5 of Fig. 1; and Fig. 6 is an enlarged fragmentary view partly in cross section of the telescopic dust guard with the telescope focusing slide in extended position.

It will be noted from the drawings that I have secured a very compact construction with the telescope level, supporting bar and post secured to the leveling base and practically concealing the spindle clamp. The leveling base 1 is of usual construction, carrying the supporting socket 2 to which the usual leveling screws 3 in their bearings 4, are affixed, with dust-proof caps or covers 5 and the retaining nut 6 on the member 2. The member 2 is formed with its post supporting socket 7 tapered to fit the correspondingly tapered post 8 having its central top portion threaded into a threaded socket in the central top portion 9 of the cross bar 10. The cross bar 10 is formed with rounded sides, ends, top, and bottom, the sides being turned inwardly at the top 11, and at the bottom portions 12, so as to protect and inclose the bearing of the post 8 on the support 2. I prefer to form the upper section of the support 2 with an annular slot 112, having a shoulder 13 around the outermost periphery to receive the spindle clamp 14 and allow said spindle clamp to be clamped to the support without any binding action being imparted to the post 8. This spindle clamp 14 is of ordinary type, having the rearmost portion split and the adjacent edges formed with lugs 15 and 16, lug 16 being threaded and 15 having clearance, in alinement to receive the correspondingly threaded portion of the clamping screw 17, said screw extending through an aperture 18 in one side of the crossbar 10 to clamp and unclamp the spindle clamp about the support 2. The spindle clamp is entirely inclosed within the crossbar and adjacent the forwardly extending portion 20 of said spindle clamp are lugs 21 and 22 formed in the crossbar 10 on a level with the portion 20 of said bracket. The lug 22 is formed hollow to receive the plunger 23 and actuating spring 24, a threaded cap 25 acting as a bearing for said spring to hold the plunger 23 outwardly in contact with the part 20 of the spindle clamp and in opposition to the adjusting screw 26 threaded through the opposite lug 21, and having its projecting point 27 bearing on the opposite side of the part 20. A milled head 28 forms a part of adjusting screw 26. Thus the adjustment of the crossbar with relation to the spindle clamp 14 is provided, although the bracket is entirely inclosed from view within the rounded sides of the crossbar 10.

I prefer to so form the lug 21 carrying the adjusting screw 26 as to permit the same to be tightened about the adjusting screw, to compensate for wear of the threads, and also to provide for such adjustment without distorting the rest of the instrument. This feature is of special importance in instruments of precision of this type, as the main adjustments must be made at the manufactory of the maker, while the separate tightening adjustment of the screw can be made in the field by the operator. To this end I form the lug 21 on the side of the crossbar 10 and saw a slot 29 longitudinally of said crossbar and partly across the lug. I also form the lug with a projecting portion 30 and saw transversely through said portion, making a slot 31 therethrough entirely open to the threaded socket receiving the stem 26. I then bore a small hole transversely through one lug and a tapped hole through the other lug of the split projection 30 to receive a screw 32. Tightening the screw 32 acts to bind the two portions 30 together, tightening same about the threaded stem 26, the slot 29 permitting this tightening action without in any way affecting, distorting, straining, or raising the crossbar. As the extreme end portions of the crossbar support the delicately adjusted bearings for the telescope, the importance of the feature just described will be appreciated.

The focusing slide 33 of the telescope is mounted to slide within a casing 34 carried in supports 35 at either end, which supports are mounted on the opposite ends of the crossbar and secured therein by screws 36. A knurled pinion head 37 mounted on a stem 38 and carrying an internal pinion 39 is provided at one side of the telescope casing, extending through a fixed bearing plate 40; said pinion meshes with a rack 41 secured to the focusing slide 33. Manipulation of the knurled pinion head 37 moves the telescope slide 33 outwardly and inwardly to secure proper focus, a slot 42 within the side of the focusing slide 33 and the length of the rack 41 limiting the scope of such adjustment. To protect the exposed part of the focusing slide 33 when the same is moved to the right, viewing the drawings, or out from the inclosing casing and bearing 34, I provide a novel form of guard or protection. This protecting device must be free to move with the focusing slide during its adjustment by the manipulation of the knurled pinion head 37, as above described, extending and contracting with said movement. To carry out this feature, I provide a series of cylindrical telescopic sections 44, 45, and 46. At the extreme forward portion of the casing I cut a suitable thread 47 to receive the correspondingly threaded inner end of the section 44, so that said section is fixed to the casing 34 and extends over and protects a portion of the focusing slide 33. Upon the section 44 is the sliding telescoping section 45, of slightly greater diameter, and on this section also is similarly positioned the circular section 46, the latter having its forward rim threaded and secured to the flange 48 of the telescope focusing slide at 49, see Fig. 6. On the forward rim of the section 44 I provide an external rib 50 and a correspondingly internal rib 51 on the inner end of the adjacent sliding section 45. Similar out-turned and in-turned ribs 52 and 53 are on the corresponding ends of the sections 45 and 46 respectively, to limit the outward movement of the same. As the telescope focusing slide is moved inwardly or outwardly of the casing 34 to adjust the same to proper focus, the cylindrical telescopic sections 44, 45, and 46 also keep the exposed portion of the focusing slide 33 guarded, protected, and concealed. The telescope focusing slide itself is thus always guarded for the full length of its traverse from damage by dust or the like working in between the focusing slide and its casing, and also is guarded from accidental blows indenting or otherwise marking the focusing slide. Should any grit or dust work into the telescopic cylindrical sections 44, 45, and 46 they can readily be cleaned, and even should such dust work in between the sections where they slide upon each other, this will not affect the alinement of the telescope.

Directly under the focusing slide and partially within the rounded upper edges 11 of the crossbar 10, I mount the level 54 on the end adjustable bearings 55 and 56 as in a well-known manner, the latter forming no special feature of my present invention.

From the foregoing it will be readily appreciated that I have provided a surveyor's instrument having all its bearing parts protected from damage, injury, dust, moisture, and grit, the telescope focusing slide being at all times covered, even during the adjustments of the focusing slide within and without of its casing. Also the supporting post and cross bar, which must be made to provide rotary movement, have the bearing thereof protected from access by dust or rain within the inclosing, protecting sides of the crossbar 10. Furthermore, the spindle clamp and its rotatable bearing upon the support is likewise protected, being still further guarded by the inwardly inclined top portions 11 of the crossbar, as well as by the central section 9 of the crossbar. The leveling screws are protected as explained in prior patent to C. L. Berger, No. 1,125,939, issued Jan'y 26, 1915, and the entire instrument is thus perfectly guarded while in use in either field work or in such difficult conditions as are daily met with in underground work.

Heretofore, it has been necessary to constantly return to the maker surveyor's instruments used in underground work, for readjusting, repairs, and often renewals of the bearing parts, but by my invention this prior difficulty is overcome. Also, in the arrangement of the adjusting screw with the split bearing therefor, this can always be maintained firm and solid irrespective of wear, and without danger of distorting the other adjustments of the instrument. Furthermore, by having the crossbar open at top and bottom, as illustrated in Fig. 4, a free interchange of air allows for quicker and better equalized action of temperature in the instrument, especially during marked or sudden changes in temperature. This is particularly important when descending from the surface into a mine, and in many other working conditions constantly met with in actual service.

Having described my invention, what I claim as new and desire to secure by Letters Patent is:

1. A surveyor's instrument, comprising a telescope, a hollow crossbar in alinement with said telescope and carrying supports for said telescope, a rotatable supporting post secured to the central uppermost part of the crossbar, and a surrounding bearing for said post extending within the sides of said crossbar, whereby the crossbar protects the rotatable post and bearing from dust, moisture, and injury.

2. A surveyor's instrument, comprising a telescope, a hollow crossbar carrying supports for said telescope, a rotatable supporting post secured to the central uppermost part of the crossbar, and a surrounding bearing for said post, a tangent bracket rotatably mounted on said bearing, a spindle clamp adjustably secured to said bearing and extending entirely within the sides of said hollow crossbar, whereby the crossbar protects the rotatable post and said tangent bracket from dust, moisture, and injury.

3. In a surveyor's instrument, a telescope, a hollow crossbar carrying the telescope bearings at each end of said bar, a rotatable supporting post for said crossbar and a surrounding bearing for said post, a tangent bracket rotatably mounted on said bearing, a spindle clamp adapted to be clamped to the post bearing and extending entirely between the hollow sides of the crossbar, and means to adjust the alinement of the crossbar with the tangent bracket.

4. In a surveyor's instrument, a telescope, a hollow crossbar carrying the telescope bearings at each end of said bar, a rotatable supporting post for said crossbar and a surrounding bearing for said post, a spindle clamp adapted to be clamped to the post bearing and extending entirely between the hollow sides of the crossbar, means to adjust the alinement of the crossbar with the spindle clamp, comprising a spring pressed plunger carried by the crossbar, adapted in position to bear on one side of said bracket, and an adjusting screw carried by the crossbar in position to bear on the other side of said bracket in opposition to said plunger.

5. In a surveyor's instrument, a telescope, a hollow crossbar carrying the telescope bearings at each end of said bar, a rotatable supporting post for said crossbar and a surrounding bearing for said post, a tangent bracket rotatably mounted on said bearing, a spindle clamp adapted to be clamped to the post bearing and extending entirely between the hollow sides of the crossbar, a clamping screw to bind the clamp on its bearing extending through an aperture in said crossbar, and means carried by said crossbar to adjust the alinement thereof with the tangent bracket.

6. In a surveyor's instrument, a telescope, a crossbar therefor, a spindle clamp adapted to be supported under said crossbar, an adjusting screw carried by said crossbar and adapted to bear upon a spindle clamp, the threaded recess for said adjusting screw being formed integrally with said crossbar and having transverse and longitudinal saw cuts therethrough, and a tightening screw uniting the transversely cut portions, whereby adjustment of said screw will tighten the threaded recess without disturbing or distorting the adjustments of the crossbar.

7. A surveyor's instrument, having a telescope, a crossbar supporting the telescope, a conical supporting post for the crossbar, a conical bearing for said supporting post, extending within the crossbar and having an annular recess in the top of the support between the conical bearing for the supporting post and the exterior of said post, a tangent bracket adapted to be rotatably and adjustably clamped on the upper part of said bearing outside of the annular recess and means extending through the crossbar to clamp the tangent bracket and additional means passing freely through the crossbar to adjust said crossbar and tangent bracket relatively to each other and independently of any clamping action on the telescope supporting post.

8. A surveyor's instrument, comprising a telescope, a hollow crossbar in alinement with said telescope, and carrying supports for the telescope, said crossbar having a recess therein to receive and to protect a level, a level therein, adjustable supports for the level, carried by the crossbar independent of the said supports for the telescope, the crossbar having openings therethrough, permitting equalizing of temperature changes on the instrument, and means to support said crossbar at its center.

In testimony whereof, I have signed my name to this specification, in the presence of two subscribing witnesses.

LOUIS H. BERGER.

Witnesses:
JAMES R. HODDER,
SEBASTIAN VAUGHAN.

Copies of this patent may be obtained for five cents each, by addressing the "Commissioner of Patents, Washington, D. C."